United States Patent
Okada

(10) Patent No.: US 7,510,987 B2
(45) Date of Patent: Mar. 31, 2009

(54) BASE CLOTH FOR COATED AIRBAG AND METHOD FOR MANUFACTURING THE SAME

(75) Inventor: Taiichi Okada, Ibaraki (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/501,638

(22) PCT Filed: Jan. 9, 2003

(86) PCT No.: PCT/JP03/00096

§ 371 (c)(1),
(2), (4) Date: Sep. 9, 2004

(87) PCT Pub. No.: WO03/060228

PCT Pub. Date: Jul. 24, 2003

(65) Prior Publication Data

US 2005/0170723 A1    Aug. 4, 2005

(30) Foreign Application Priority Data

Jan. 16, 2002    (JP)    ............... 2002-007115

(51) Int. Cl.
*B32B 27/12*    (2006.01)
*D03D 15/00*    (2006.01)

(52) U.S. Cl. ............... 442/195; 442/104; 442/189; 442/192

(58) Field of Classification Search ............... 442/104, 442/189, 192, 195
See application file for complete search history.

(56) References Cited

U.S. PATENT DOCUMENTS 5,897,929 A * 4/1999 Li et al. ............... 428/36.1

(Continued)

FOREIGN PATENT DOCUMENTS

JP    2003-041487    2/2003

(Continued)

OTHER PUBLICATIONS

JP 7-252740 A Toray Industries, Inc. Oct. 3, 1995. English Translation.*

(Continued)

*Primary Examiner*—Jenna-Leigh Johnson
(74) *Attorney, Agent, or Firm*—DLA Piper LLP (US)

(57) ABSTRACT

A coated base fabric for airbags, which is fabricated by applying a resin elastomer to a base fabric formed of flattened cross-section yarns having a degree of filament cross-section flatness (that is, a ratio of the major axis length to the minor axis length of the filament cross-section) of from 1.5 to 8, and which is characterized in that the filaments are aligned in the base fabric in such a manner that the total average horizontal index (HI) represented by the following formula falls within a range of from 0.75 to 1.0, and the amount of the resin elastomer adhered to the fabric is from 0.1 to 60 g/m². The base fabric for airbags has well-balanced properties of good mechanical properties, flame resistance, complete air-imperviousness, flexibility, compactness and containability.

5 Claims, 2 Drawing Sheets

U.S. PATENT DOCUMENTS

| | | | |
|---|---|---|---|
| 6,283,507 B1 * | 9/2001 | Kami et al. | 280/743.1 |
| 6,770,578 B2 * | 8/2004 | Veiga | 442/164 |
| 2001/0046823 A1 | 11/2001 | Sogi et al. | |
| 2003/0008582 A1 | 1/2003 | Koketsu et al. | |

FOREIGN PATENT DOCUMENTS

| | | |
|---|---|---|
| JP | 2003-41487 A | 2/2003 |
| WO | 99/35328 | 7/1999 |
| WO | WO 99/35328 A | 7/1999 |

OTHER PUBLICATIONS

JP 07-252740 A Oct. 3, 1995. (English Translation).*

*Change to offensive with flat fiber yarn*, Article in nihon seni shinbun (Japanese newspaper), Sep. 5, 2001 (1 sheet) and English translation of same.

* cited by examiner

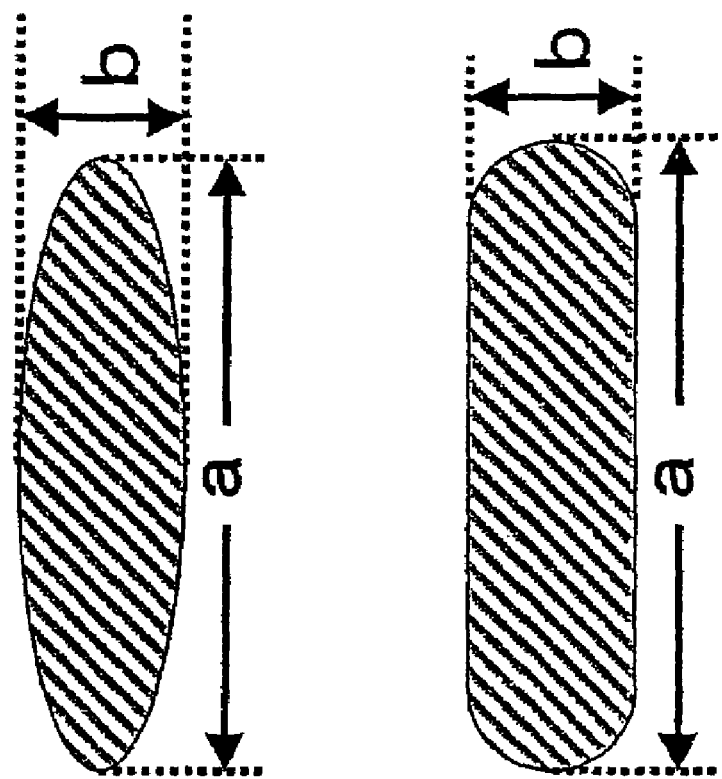

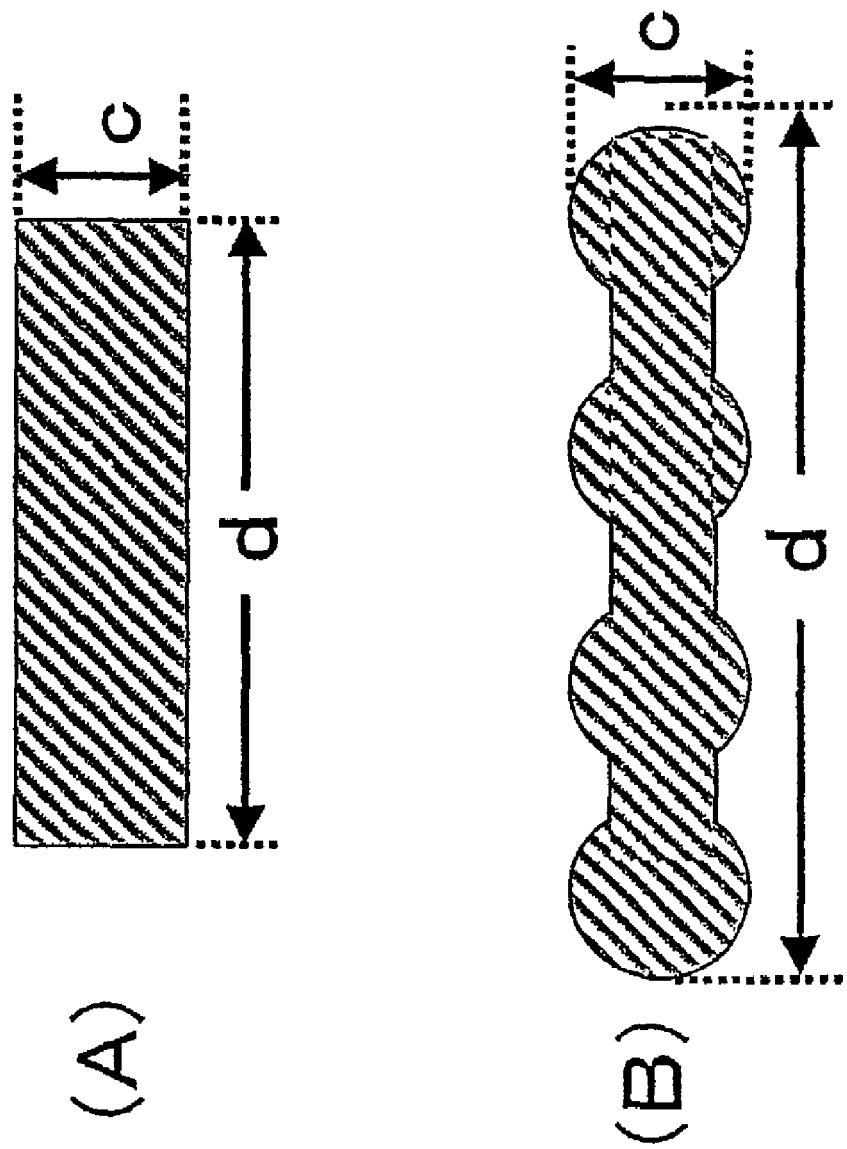

BASE CLOTH FOR COATED AIRBAG AND METHOD FOR MANUFACTURING THE SAME

TECHNICAL FIELD

This disclosure relates to a base fabric for airbags, which is coated with a resin elastomer on its surface and which has good mechanical properties, heat resistance, compactness and containability, and relates to a method for manufacturing it.

BACKGROUND

At present, airbags are indispensable for ensuring the safety of drivers and passengers in automobiles, and the percentage of airbag installation in automobiles is increasing.

The requirement for improved reliability of airbags as safety devices is even more increasing, and the other requirements for compactness and cost reduction of airbag devices are also further more increasing. Accordingly, more improvements are required for base fabrics for airbags and for the process of producing yarns and base fabrics for airbags so as to satisfy the above mentioned requirements.

Techniques have heretofore been disclosed for realizing air bags that are compactly foldable to save the necessary housing space, not interfering with good mechanical properties of base fabrics for airbags. Above all, a technique of using a fabric of modified cross-section yarns for base fabrics for airbags is specifically noticed since it satisfies the capabilities such as safety and containability necessary to next-generation airbags.

The prior-art techniques of using modified cross-section yarns are, for example, in JP-A 4-193647, 4-201650, 7-252740, 8-60425, 2002-129444, and U.S. Pat. No. 6,037,047.

JP-A 4-193647 and 4-201650 disclose a base fabric for airbags which is lightweight, flexible and containable and has good mechanical properties, for which are used polyamide multifilaments composed of a plurality of modified cross-section filaments each having a filament fineness of from 1.0 to 12 deniers and having a degree of cross-section modification of from 1.5 to 7.0.

However, the technique disclosed is to utilize the entanglements and the loops formed in yarns for the surface characteristics of fabrics to thereby increase the surface area of the fabric and increase the efficiency of resin adhesion to the fabric, or that is, to increase the adhesiveness of resin to the fabric. In addition, the technique is characterized by increasing the bulkiness of fabrics to thereby increase the thickness of the fabrics that are still flexible. In other words, the technique has no intension of reducing the amount of resin to be adhered to fabrics and reducing the thickness of the fabrics.

JP-A 7-252740 discloses a base fabric for airbags, which is formed of multifilament yarns having a degree of filament cross-section flatness of at least 1.5, a total fineness of from 180 deniers to 450 deniers, a filament fineness of from 0.1 deniers to 7.0 deniers, a tenacity of at least 7.5 g/d, and an elongation of at least 12.0%.

It says that, according to the technique disclosed therein, a base fabric for airbags that is lightweight and containable and has low air permeability could be surely formed of yarns having a flattened filament cross-section and having a specific total fineness and specific filament fineness. However, the base fabric is not coated, or that is, the technique is for attaining reduced air permeability of non-coated base fabrics, and is not for attaining improved compactness and containability of coated base fabrics that are formed by coating base fabrics with resin.

JP-A 8-60425 discloses fibers for airbags, which are so designed that, in the filament cross-section, there exist from 1 to 3 nearly semi-circular projections symmetrically given in the major-axis direction of the flattened base of the cross-section, the ratio of the major axis to the minor axis of the flattened cross-section filament falls between 4/1 and 2/1, the filament fineness is from 2 to 10 deniers, and the tenacity is at least 7 g/d. However, the technique disclosed is for improving the producibility of the fibers by forming the projections in the filament cross-section thereof, while, on the other hand, the projections interfere with the packing capability of the filaments, and, as a result, the fabric formed of the fibers is unsatisfactory in point of reducing the thickness thereof. In addition, the reference is silent on resin coating, and discloses the technique that relates to non-coated base fabrics.

JP-A 2002-129444 discloses a technique for improving the containability and the air-imperviousness of non-coated base fabrics for airbags. However, this is silent on a technique of making the best use of the characteristics of flattened yarns as much as possible, or that is, this gives no description of indicating a technique for aligning the constitutive fibers in a base fabric in such a manner that the major axis of the warp and the weft to constitute the base fabric is highly oriented in the horizontal direction of the base fabric in the cross-section thereof.

U.S. Pat. No. 6,037,047 discloses the effectiveness of diamond-shaped or S-shaped flattened cross-section yarns for polyester fiber fabrics having good covering capability and flexibility, saying that the yarns of the type are useful for fabrics for airbags. The polyester fiber fabrics formed of the diamond-shaped or S-shaped flattened cross-section yarns described in the patent specification surely have good covering capability and are highly flexible although they are formed of polyester fibers, but when compared with fabrics of polyamide fibers, it could not be said that the polyester fiber fabrics are specifically effective. In addition, the patent specification gives no description of coated base fabrics for airbags, and it may be said that this discloses a technique of non-coated base fabrics for airbags.

On the other hand, recently, non-coated base fabrics with no resin coating have become widely popularized with the intensive increase in the requirement for compactness, containability and cost reduction of airbags. Non-coated airbags are surely advantageous over coated airbags in point of the compactness, containability and cost reduction, but are disadvantageous than the latter in point of the heat resistance and the gas imperviousness, and, in addition, the safety of the former would be problematic as compared with that of the latter. In particular, the output power of inflators is being increased these days for further increased airbag safety. With that, therefore, base fabrics for airbags are required to have more increased heat resistance and air imperviousness, and at their most extreme, base fabrics are required to have a air permeability of 0 (zero). Given that situation, coated base fabrics with resin coating formed on the surface of base fabrics are still useful for airbags.

It could therefore be advantageous to provide a base fabric for airbags that has well-balanced properties of flame resistance, complete air-imperviousness and compactness that could not be attained by any conventional non-coated or coated base fabrics for airbags and to provide a coated base fabric for airbags that satisfy both good safety and good containability, or that is, for those which are thin and have good mechanical properties and good heat resistance and, when they have expanded, release substantially no gas except through the vent hole thereof, and which have good flexibility, compactness and containability.

SUMMARY

We provide a coated base fabric for airbags, which is prepared by coating a base fabric with a resin coat that has good flame resistance and enables substantially zero air-perviousness and which has improved compactness and containability, and provides a method for producing it.

We also provide a coated base fabric for airbags, which is fabricated by applying a resin elastomer to a base fabric formed of flattened cross-section yarns having a degree of filament cross-section flatness (that is, a ratio of the major axis length to the minor axis length of the filament cross-section) of from 1.5 to 8, and which is characterized in that the filaments are aligned in the base fabric in such a manner that the total average horizontal index (HI) represented by the following formula falls within a range of from 0.75 to 1.0, and the amount of the resin elastomer adhered to the fabric is from 0.1 to 60 g/m²:

$$HI=(\Sigma hi)/f$$

wherein
$hi=\cos \theta$,
$\theta$ indicates the angle between the major axis direction of each filament and the horizontal direction of the fabric,
f indicates the number of the filaments.

The following (a) to (d) are preferred aspects of the coated base fabric for airbags. Satisfying these conditions produces further better results.
(a) The horizontal index (HI) falls between 0.85 and 1.0.
(b) The amount of the resin elastomer adhered to the fabric is from 5 to 30 g/m².
(c) The coated base fabric satisfies the following conditions (1) to (4):
  (1) Cover factor: 1500 to 2400,
  (2) Tensile strength: 500 to 750 N/cm,
  (3) Tear strength: 200 to 400 N,
  (4) Thickness: 0.20 to 0.35 mm.
(d) The flattened cross-section yarn is formed of a polyamide having a sulfuric acid-relative viscosity of at least 3.0.

We also provide a method for producing the coated base fabric for airbags, which comprises applying a resin elastomer to a base fabric formed of flattened cross-section yarns having a degree of filament cross-section flatness (that is, a ratio of the major axis length to the minor axis length of the filament cross-section) of from 1.5 to 8, and which is characterized in that a tension of from 0.05 to 0.6 cN/dtex is given to the warp and the weft in weaving them so that the woven fabric may have a total average horizontal index (HI) represented by the following formula falling within a range of from 0.75 to 1.0:

$$HI=(\Sigma hi)/f$$

wherein
$hi=\cos \theta$,
$\theta$ indicates the angle between the major axis direction of each filament and the horizontal direction of the fabric,
f indicates the number of the filaments.

The following (e) to (h) are preferred aspects of the method for producing the non-coated base fabric for airbags. Satisfying these conditions produces further better results.
(e) The coated base fabric for airbags is produced so that it may satisfy the following conditions (1) to (4):
  (1) Cover factor: 1500 to 2400,
  (2) Tensile strength: 500 to 750 N/cm,
  (3) Tear strength: 200 to 400 N,
  (4) Thickness: 0.20 to 0.35 mm.
(f) After the warp and the weft are woven with a tension of from 0.05 to 0.6 cN/dtex given thereto, the resulting fabric is heated under pressure.
(g) The heating temperature falls between 180 and 220° C.; and the linear load for pressure falls between 3000 and 10000 N/cm.
(h) The number of entanglements of the flattened cross-section filaments yarn is from 3 to 20/m, and the fabric is so woven that the number of entanglements of the flattened cross-section filaments yarn in the fabric is at most 3/m.

BRIEF DESCRIPTION OF THE DRAWINGS

FIG. 1 is a graphic view showing examples of the filament cross-section profile of the yarn for the base fabric.

FIG. 2 is a graphic view showing examples of the cross-section profile of the orifice of the spinneret used herein for producing flattened cross-section yarn for the base fabric.

The meanings of the signs in the drawings are as follows:
a: major axis of filament,
b: minor axis of filament,
c: minor axis of spinneret orifice,
d: major axis of spinneret orifice.

DETAILED DESCRIPTION

The coated base fabric for airbags is formed of synthetic fibers such as polyamide fibers, polyester fibers, polyolefin fibers, polyvinyl alcohol fibers and the like, and the material of the fibers is not specifically defined. Polyamide is preferred for the material. Polyamide fibers include fibers of polyhexamethylene (N66), polycapramide (N6), polytetramethyleneadipamide (N46), and copolymers and blends of such polymers.

Especially for obtaining high-tenacity and high-toughness fabrics for the invention, high-molecular-weight polyamide polymers having a sulfuric acid-relative viscosity of at lest 3.0, preferably at least 3.3 are used.

The fabric is widely used in various applications for industrial materials such as those for airbags. For it, therefore, it is desirable to use fibers that contain various additives of heat-resisting agent, light-proofing agent and antioxidant in order that the fabric could have chemical resistance, for example, it may have high-level heat resistance, weather resistance and oxidation resistance. In polyamide fibers, for example, usable are various copper salts such as copper acetate, copper iodide, copper bromide, cupric chloride, as well as inorganic or organic copper complex salts; alkali metal or alkaline earth metal halides such as potassium iodide, sodium iodide, potassium bromide, lithium chloride, calcium chloride; hindered phenol-type antioxidants, diphenylamine-type antioxidants, imidazole-type antioxidants, inorganic or organic phosphorous compounds and UV-absorbents, and manganese salts. Regarding their content, the amount of the metal salts may be generally from 10 to 100 ppm in terms of metal, and the amount of the other additives may be from 500 to 5000 ppm or so.

Depending on the use thereof, the fabric may contain a mat agent such as titanium oxide, calcium carbonate, kaolin, as well as a lubricant such as calcium stearate.

The filament cross-section profile of the yarn for the coated base fabric for airbags is generally oval as in FIG. 1(A), or corner-rounded rectangular oval as in FIG. 1(B). Apart from such oval profiles, it may be any others of which the major axis (a) and the minor axis (b) satisfy the relationship mentioned below. For example, it includes not only bilateral symmetric configurations such as rectangles, diamonds, cocoons, but also bilateral asymmetric configurations or their combinations. In addition, the basic configurations as above may be modified to have projections or recesses or to have hollows, not detracting from the airbag.

The major axis and the minor axis as referred to herein correspond to the major axis and the minor axis, respectively of an oval. On the other hand, when the filament cross-section profile is not oval as so mentioned hereinabove, then a center-of-gravity line that runs through the center of gravity of the filament cross-section profile is drawn, and the longest line segment is defined as the major axis of the profile. The longest line segment that is vertical to the major axis is defined as the minor axis thereof.

Of the flattened cross-section yarns, the degree of filament cross-section flatness (the ratio of the major axis length to the minor axis length of the filament cross-section) must be indispensably from 1.5 to 8, but is preferably from 2 to 6. Using the flattened cross-section yarns falling within the range makes it possible to align the constitutive filaments in such a manner that the major axis thereof could be in the horizontal direction of the base fabric. As compared with ordinary circular cross-section yarns, the fabric of the flattened cross-section yarns of the type may be thinned and its containability is better. If the degree of flatness is smaller than 1.5, then the yarns will be near to circular cross-section yarns and could not enjoy the effect of flattened cross-section yarns. On the other hand, if the degree of flatness is over 8, then the effect of the flattened cross-section yarns will be saturated and, in addition, it may produce a problem in that high-tenacity and high-toughness fibers of high quality could not be made stably.

Ordinary circular cross-section yarns having smaller filament fineness would exhibit a better covering capability in fabrics, and the fabrics formed of them would be more flexible and more containable. On the other hand, however, the yarns of the type have a problem in that their producibility is lowered with the reduction in the filament fineness thereof. In other words, when the producibility (production efficiency and yield) is taken into consideration, then the reduction in the filament fineness for improving the flexibility and the containability of fabrics is limited.

As opposed to this, the flattened cross-section yarns mentioned above may fully exhibit the same effect as that of the filament fineness reduction in circular cross-section yarns, even though the filament fineness thereof is not actually reduced. This is because, for example, the minor axis of flattened cross-section polyamide yarns having a degree flatness of 3.5 and a filament fineness of 10 dtex corresponds to the diameter of circular cross-section yarns having a filament fineness of 2.4 dtex. Further, for example, the minor axis length of flattened cross-section yarns having a degree of flatness of 3.5 and a filament fineness of 4 dtex corresponds to the diameter of microfibers having a filament fineness of at most 1 dtex that are generally difficult to stably produce. In other words, the flattened cross-section yarns may exhibit the effect of filament fineness reduction that could not be attained by circular cross-section yarns.

Preferably, the flattened cross-section yarns for use in the invention have a tenacity of from 7 to 10 cN/dtex, an elongation of from 10 to 30%, and boiling-water shrinkage of from 3 to 8%. Using the synthetic fibers having the physical properties makes it possible to obtain the intended base fabric for airbags that has good mechanical properties such as tensile strength and tear strength. The characteristics of the yarns are almost on the same level as those of circular cross-section yarns that are generally used for airbags.

The coated base fabric for airbags is formed of the specific flattened cross-section yarns as above, and it is the greatest and the most important characteristic that, in the cross-section of the base fabric, the major axis direction of the filament cross-section of the yarns of the warp and the weft that constitute the base fabric is oriented in the horizontal direction of the base fabric. In other words, when the base fabric for airbags is cut in the direction vertical to the warp thereof and when the cross-section of the warp is observed, then the major axis of the flattened cross-section thereof is oriented in the direction substantially parallel to the weft direction of the base fabric. Similarly, when the base fabric is cut in the direction vertical to the weft and when the cross-section of the weft is observed, then the major axis of the flattened cross-section thereof is regularly oriented in the direction substantially parallel to the warp direction of the base fabric.

To quantitatively express it, a total average horizontal index (HI) is defined herein. The total average horizontal index, HI is indicated by the total average of the cosine (hi) of the angle ($\theta$) at which the major axis of the flattened cross-section of each filament of the base fabric crosses the horizontal direction of the base fabric. Numerically, HI is represented by the following equation:

$$HI=(\Sigma hi)/f$$

wherein
hi=cos $\theta$,
$\theta$ indicates the angle between the major axis direction of each filament and the horizontal direction of the fabric,
f indicates the number of the filaments.

The total average horizontal index HI of the base fabric that comprises the flattened cross-section yarns of the invention is from 0.75 to 1.0, preferably from 0.85 to 1.0, more preferably from 0.90 to 1.0. The total average horizontal index HI falling within the range makes the base fabric thin, and this makes it possible to provide herein the intended coated base fabric for airbags that has good flexibility and containability. In addition, since the surface of the base fabric may be more flattened, it may be coated more thinly and more uniformly with a resin elastomer. As a result, it is therefore possible to obtain the intended coated base fabric for airbags of the invention that is light and has good flexibility and containability. If the total average horizontal index HI is less than 0.75, then the invention is ineffective even though the flattened cross-section yarns are used, or that is, thin and containable base fabrics are difficult to obtain.

The coated base fabric for airbags of the invention is formed of flattened cross-section yarns having a degree of flatness of from 1.5 to 8, and is characterized in that the major axis direction of the constitutive filaments is regularly oriented in the horizontal direction of the base fabric. Preferably, the base fabric satisfies the following characteristics (1) to (4):

(1) Cover factor: 1500 to 2400,
(2) Tensile strength≧400 N/cm,
(3) Tear strength≧200 N,
(4) Thickness: 0.20 to 0.35 mm.

The cover factor is preferably from 1500 to 2400, more preferably from 1700 to 2200.

The cover factor is represented by:

$$(D_1 \times 0.9)^{1/2} \times N_1 + (D_2 \times 0.9)^{1/2} \times N_2,$$

in which $D_1$ (dtex) indicates the total fineness of the warp; $N_1$ (/2.54 cm) indicates the texture density of the warp;

$D_2$ (dtex) indicates the total fineness of the weft; and
$N_2$ (/2.54 cm) indicates the texture density of the weft.

The cover factor of the base fabric is directly correlated with the containability such as the thickness and the flexibility thereof, and with the mechanical properties such as the tensile strength and the tear strength thereof, and it is important that the cover factor of the base fabric falls within a suitable range. In the base fabric for airbags, the constitutive filaments have flattened cross-section, and they are regularly aligned in the horizontal direction of the base fabric. Therefore, the covering property of the fabric is extremely good, and the cover factor thereof may be lowered by 10 to 30% as compared with that of ordinary base fabrics formed of circular cross-section yarns. The possibility of reducing the cover factor enables to reduce the amount of the yarns to constitute the fabric and enables to reduce the count of the constitutive yarns, and therefore, the time necessary for weaving the fabric may be shortened and the cost of the base fabric for airbags may be thereby reduced.

The tensile strength of the base fabric is preferably at least 500 N/cm, more preferably at least 550 N/cm; and the tear strength thereof is preferably at least 200 N, more preferably at least 250 N. The base fabric that has the good mechanical properties such as the tensile strength and the tear strength falling within the ranges as above is applicable to all types of airbags, such as airbags for drivers, airbags for passengers, side airbags, knee airbags, airbags for inflatable curtains, etc., as it is resistant to the shock in bag expansion.

In particular, the coated base fabric for airbags is characterized in that the tear strength thereof is high relative to the tensile strength thereof. Though depending on the filament fineness thereof, the ratio of the tear strength to the tensile strength of a fabric of ordinary circular cross-section yarns falls almost between 1/2.5 and 1/1.5 or so, and it decreases with the reduction in the filament fineness of the yarns. On the other hand, the ratio of the tear strength to the tensile strength of the base fabric for coated airbags falls between 1/1.5 and 1/1.2 or so, or that is, the tear strength of the fabric is high relative to the tensile strength thereof, and, in addition, the base fabric is characterized in that the ratio of the tear strength to the tensile strength thereof decrease little even when the filament fineness of the constitutive yarns decreases. This is effective for preventing the propagation of broken sites such as tears and holes formed in the surface of the base fabric owing to the shock given thereto. The flattened cross-section filaments to constitute the coated base fabric for airbags have an extremely good covering capability and they are packed to a high density and woven into the fabric. In the base fabric, therefore, the woven filaments would behave as if they were bundled into one flattened filament, and could express such a high tensile strength.

Preferably, the thickness of the coated base fabric for airbags is from 0.20 to 0.35 mm. Having the thickness that falls within the range, the base fabric is sufficiently resistant to heat of the high-temperature gas that is jetted out from an inflator, and therefore may be favorably built in small-sized cars that require more severe containability. The thickness of the coated base fabric for airbags may be reduced by about 15% or more, as compared with those formed of conventional circular cross-section yarns having the same cover factor. This confirms the superiority of the base fabric in point of the compactness and the containability thereof.

The amount of the resin elastomer to be adhered to the base fabric for airbags is from 0.1 to 60 g/m$^2$, preferably from 5 to 30 g/m$^2$, more preferably from 10 to 20 g/m$^2$. If the coating resin amount is less than 0.1 g/m$^2$, then the entire surface of the base fabric could not be uniformly coated with the resin even though it is formed of the flattened cross-section yarns, and if so, gas leakage will occur in bag expansion and the fabric will have a risk of burst. On the contrary, if the coating resin amount is over 60 g/m$^2$, then the containability and the flexibility of the coated fabric will be poor even through the flattened cross-section yarns are used in forming the fabric. Since the base fabric is characterized in that the constitutive filaments has a flattened cross-section profile and the major axis of the filament cross-section is regularly oriented in the horizontal direction of the base fabric, its surface is more flattened as compared with those of ordinary circular cross-section yarns, and therefore can be coated thinly and uniformly with a resin elastomer. As a result, the base fabric is thin and flexible and its containability is improved. The surface of a base fabric formed of ordinary circular cross-section yarns is roughened, and therefore when it is entirely coated with resin, then the necessary amount of the resin will be larger than that for the base fabric.

One example of a method for producing the coated base fabric for airbags is described below.

As mentioned hereinabove, the synthetic fibers having a flattened cross-section for use in the coated base fabric for airbags may be various polymer fibers. Polyamide is preferred for obtaining high-tenacity and high-toughness fibers. In particular, high-viscosity nylon 66 polymer having a sulfuric acid-relative viscosity of from 3.0 to 4.0 is preferred.

For producing the fibers, a polymer is melted, filtered and spun out trough orifices of a spinneret. The spinneret is so designed that its orifices could have a flattened cross-section as specifically defined for the cross-section of the constitutive filaments. In particular, the spinneret orifices are designed in consideration of the change of the cross-section profile of the spun yarns owing to the surface tension thereof while they are cooled and solidified after having been spun out.

For example, in order to obtain the fibers having an oval cross-section profile as in FIG. 1(A), the spinneret orifice may be so designed as to have a rectangular profile as in FIG. 2(A). The vertical length c of the rectangle and the horizontal length d thereof shall be suitably determined in accordance with the filament fineness and the degree of flatness of the fibers to be obtained. On the other hand, in order to obtain the fibers having a corner-rounded rectangular oval profile as in FIG. 1(A), the spinneret orifice may be so designed that it has small circles at both ends and inside it and the small circles are combined together via a slit, as in FIG. 2(A). In this aspect, the number of the small circles and the diameter thereof, the length of the slit and the width thereof, and the vertical length c and the horizontal length d of the overall orifice shall be suitably determined in accordance with the filament fineness and the degree of flatness of the fibers to be obtained. In order that the facing two sides of the cross-section could be linear and more parallel to each other, it is desirable that the number of the small circles is from 4 to 8, the diameter thereof is from 0.1 to 0.3 mm, the width of the slit is from 0.1 to 0.3 mm and the length thereof is from 0.1 to 0.3 mm, though depending on the atmospheric condition after the spinneret.

After being cooled and solidified, the spun yarns are given oil, and wound up around a take-up roller that rotates at a predetermined rotation speed. Next, these were continuously wound up successively around Nelson rollers that rotate at high speed, and are thereby drawn between them. For obtaining fibers of higher strength, they are preferably drawn in two or more multiple stages. Also preferably, the final drawing roller temperature is 200° C. or higher on which the fibers are drawn under heat, and then the thus thermally-drawn fibers are relaxed and wound up. This is favorable for obtaining suitably shrinkable fibers. With the increase in the fiber production efficiency in the art, the fibers may be produced according to a process of simultaneously and directly spinning and drawing 4 to 8 yarns at a take-up speed of from 2500 to 4500 m/min.

In general, the yarns are subjected to treatment for entanglement before they are wound up, so that they may be well bundled up. The treatment for yarn entanglement may be attained by applying high-pressure air to the running yarns in the direction that crosses the yarns, via multiple air nozzles directed thereto. With the increase in the number of the entanglements formed, the bundlability of the yarns is better. This is favorable since the in-line runnability of the yarns in warping or weaving them into fabrics is good. On the other hand, however, it is desirable that the entanglements of the yarns are untangled and the number of the entanglements of the yarns still remaining in the base fabric is substantially as small as possible. If a large number of entanglements remain in the base fabric, then the constitutive yarns will be twisted in places in the fabric and, if so, the fabric could not satisfy the specific range of the total average horizontal index HI that is one important factor in the invention. Suitably, the number of entanglements to be given to the yarns in the invention is from 3 to 20/m, preferably from 5 to 15/m, more preferably from 5 to 10/m. Also preferably, the number of entanglements of the fibers in the base fabric is at most 3/m both in the warp and in the weft. Having the number of entanglements falling within the range, the HI level of the yarns that constitute the base fabric may be fully increased both in the warp direction and in the weft direction of the fabric, not detracting from the in-line runnability of the yarns in warping or weaving them into fabrics, and after all, thin, flexible and containable base coated fabrics for airbags may be produced with high producibility.

The yarns obtained in the manner as above are warped and woven into fabrics. Water-jet looms are often used. However, without being limited, any of rapier looms and air-jet looms are also usable. Regarding the texture structure of the base fabric, plain fabrics are popular. However, without being limited, any others such as twill fabrics are also employable herein.

In the warping and weaving process, the warp tension is suitably controlled so that the flattened cross-section filaments could be oriented in the horizontal direction of the base fabric to be produced, and the thus-controlled yarns are woven while the implanting tension of the weft is controlled to a suitable degree. The suitable warp tension falls between 0.05 and 0.6 cN/dtex. If the warp tension in weaving is lower than 0.05 cN/dtex, then the total average horizontal index HI which is an important factor and indicates the alignment condition of the flattened cross-section filaments in the cross-section of the base fabric produced could not be satisfactorily high and, as a result, base fabrics of good flexibility and containability for airbags could not be obtained. On the contrary, if the warp tension is over 0.6 cN/dtex, then the total average horizontal index HI will rather lower and the characteristics of the base fabric for airbags could not be obtained. In addition, if the warp tension in weaving is too high, then the filaments may be cut and the overall yarns will also be cut, and, as a result, the weaving loom must be stopped. In such a case, the quality of the fabrics produced will lower and the production efficiency will also lower.

On the other hand, the weft is not warped and is directly implanted in the weaving process. Therefore, the weft tension must be carefully controlled so that the entanglements in the weaving yarns may be well untangled and the major axis of the flattened cross-section yarns may be oriented in the horizontal direction of the base fabric being produced. In general, the weft tension is so controlled that the entanglements of the weft could be almost solved in the line where the yarns are released from the stock cheese yarn package to be on a measuring drum just before they are implanted as the weft. The tension range may be from 0.05 to 0.6 cN/dtex, preferably from 0.2 to 0.5 cN/dtex. The tension in weft implantation may also be from 0.05 to 0.6 cN/dtex. In recent high-speed water-jet looms, the weft implantation tension is relatively high. In these, therefore, even though the entanglements are not still solved just before the weft implantation, the filaments of the weft could be so aligned that the major axis of the cross-section thereof is oriented in the horizontal direction of the base fabric being woven. On the other hand, however, in rapier looms or air-jet looms, the weft implantation tension is low. In these, therefore, it is desirable that the entanglements of the weaving yarns are solved before weft implantation by applying tension thereto before.

In that manner, the flattened yarn base fabric is obtained in which both the warp and the weft are so aligned that the major axis of the cross-section of the constitutive flattened cross-section filaments is oriented in the horizontal direction of the base fabric.

For more surely and stably expressing the desired effect and for more remarkably exhibiting the properties of the base fabric that are better than those of conventional flattened yarn base fabrics, it is desirable that the base fabric obtained as above is pressed under heat for calendering.

The calendering machine may be any ordinary one. The calendering temperature may fall between 180 and 220° C., and the linear pressure may fall between 3000 and 10000 N/cm, and the line speed may fall between 4 and 50 m/min. The calendering treatment may be applied to at least one face of the fabric for sufficiently improving the properties of the processed fabric.

Next, the base fabric is coated with a resin elastomer, and then heat-set to be that for coated airbags. As the case may be, the woven fabric may be scoured and then coated with a resin elastomer.

For coating the surface of the base fabric with a resin elastomer, generally employed are a method of dipping the base fabric in a resin solution tank, followed by removing the excess resin by mangling or vacuuming, or by the use of a coating knife to thereby form a uniform resin coating thereon; and a method of spraying the base fabric with a resin elastomer by the use of a spraying device or a foaming device. Of those, the method of using a coating knife is preferred for forming a uniform resin coating and for saving the resin, but this is not limitative.

The resin elastomer to be applied to the base fabric is not specifically defined. Preferred are those of good flame resistance, heat resistance and air imperviousness. For example, silicone resin, chloroprene resin, polyurethane resin and polyamide resin are popular.

The resin coating process is not specifically defined in point of the order of the processing steps, not interfering with the effect of the invention.

Fibers having a specific cross-section profile and base fabrics having a specific structure are designed. Specifically, flattened cross-section yarns of which the cross-section profile has a degree of flatness of from 1.5 t 8 are used, and they are regularly so aligned that the cross-section major axis direction of the constitutive filaments is oriented in the horizontal direction of the base fabric. With that, we realized two effects: One is that the base fabric is thin and flexible, and the other is that the surface of the base fabric is flattened and is therefore coated thinly and uniformly with a resin elastomer. In addition, the yarns and the base fabric have good mechanical properties of tenacity and elongation. As a result of the above, we made it possible to provide a coated base fabric for airbags that has good and well-balanced properties necessary for base fabrics for airbags, such as good mechanical properties, heat resistance, complete gas imperviousness (zero gas perviousness), compactness and containability that could not be attained until now.

The flattened cross-section yarns and the coated base fabric for airbags may be produced with high producibility, not requiring any specific method and apparatus, and their practicability is great.

EXAMPLES

The fabrics are described concretely with reference to the following Examples and Comparative Examples.

The physical properties referred to in the specification and in the following Examples are measured according to the methods mentioned below.

Properties of Yarns:

[Degree of Flatness]:

Fibers are cut, and their cross-sections are photographed through an optical microscope (×200). On the picture, the major axis length (a) and the minor axis length (b) of each fiber cross-section are measured, and its ratio indicates the degree of flatness of the fiber analyzed. 10 filaments are analyzed and their data are averaged.

Degree of Flatness=$a/b$.

[Total Fineness]:

According to the method of JIS L-1013, the conditioned weight fineness is determined.

[Filament Fineness]:

The total fineness is divided by the number of the filaments analyzed.

[Tenacity, Elongation]:

A sample to be analyzed is left as hanks in a temperature-humidity conditioned room at 20° C. and 65% for 24 hours or more, and measured according to the method of JIS L-1013. The sample length is 25 cm, and the pulling rate is 30 cm/min.

[Boiling Water Shrinkage]:

Yarns are sampled as hanks, and conditioned in a temperature-humidity conditioned room at 20° C. and 65% RH for 24 hours or more. A load corresponding to 1 cN/dtex is applied to the sample, and the length $L_0$ of the sample is measured. Next, the sample is immersed in boiling water for 30 minutes under no tension, and then dried in air in the temperature-humidity conditioned room for 4 hours. A load corresponding to 1 cN/dtex is again applied to the sample, and the length $L_1$ of the sample is measured. From the data $L_0$ and $L_1$, the boiling water shrinkage of the sample is derived according to the following equation:

Boiling water shrinkage=$[(L_0-L_1)/L_0]\times100$ (%).

[Number of Entanglements]:

According to a water-dipping method, the number of entanglements points that have length of at least 1 mm of a sample is measured, and the number thereof per m of the sample is derived from it. Ten yarns are analyzed, and their data are averaged.

The water bath has a length of 70 cm, a width of 15 cm and a depth of 5 cm. This is partitioned at 10 cm from each end in the longitudinal direction, and filled with pure water. Yarn samples are dipped in it, and the number of entanglements of each sample is measured. To remove the influence of impurities such as oil on the measurement, the pure water in the bath is exchanged for fresh one in every measurement.

[Number of Entanglements in Base Fabric]:

A base fabric to be analyzed is decomposed, and 10 warp yarns and 10 weft yarns are sampled. These samples are analyzed for the number of the entanglements therein, according to the same water-dipping method as above. The data of the ten samples are averaged separately for the warp and the weft.

Properties of Base Fabrics:

[Cover Factor]:

Represented by:

$$(D_1\times0.9)^{1/2}\times N_1+(D_2\times0.9)^{1/2}\times N_2,$$

in which $D_1$ (dtex) indicates the total fineness of the warp; $N_1$ (/2.54 cm) indicates the texture density of the warp; $D_2$ (dtex) indicates the total fineness of the weft; and $N_2$ (/2.54 cm) indicates the texture density of the weft.

[Horizontal Index HI]:

A base fabric to be analyzed is cut in the warp cross-section direction and in the weft cross-section direction, and the two cross-sections are photographed with a scanning electronic microscope (SEM). On the picture of the warp cross-section and that of the weft cross-section, the angle θ at which the major axis of the cross-section of each flattened cross-section filament crosses the horizontal direction of the base fabric is measured. The cosine of the angle (hi) is obtained, and the total average thereof indicates the horizontal index (HI) of the sample analyzed.

Horizontal index $HI=(\Sigma hi)/f$ wherein
  hi=cos θ,
  θ indicates the angle between the major axis direction of each filament and the horizontal direction of the fabric,
  f indicates the number of the filaments.

Unless otherwise specifically indicated, one warp yarn and one weft yarn are sampled, and all the constitutive filaments of each yarn are analyzed.

[Tensile Strength]:

Measured according to the method of JIS L1096 (6.12.1A method).

[Tear Strength]:

Measured according to the method of JIS L1096 (6.15.2A-2 method). The data are averaged in the warp direction and in the weft direction.

[Air Permeability]:

Measured according to the method of JIS L-1096 (6.27.1A method). Briefly, a base fabric to be analyzed is cut to prepare its sample having a length of 20 cm and a width of 15 cm. Air having a controlled pressure of 19.6 KPa is made to run through a circular part having a diameter of 10 cm of the sample, and the amount of the air (cc/cm²/sec) having passed through the circular part is measured by the use of a laminar flow air permeation meter.

[Thickness of Base Fabric]:

Measured according to the method of JIS L1096 (6.5).

[Degree of Stiffness]:

Measured according to the method of JIS L1096 (6.19.1A method).

[Thickness of Airbag (Bag Containability)]

The base fabric produced is fabricated into an airbag of a volume of 60 liters mentioned below. This is bellows-wise folded from the right and left directions each into four, and then from the top and bottom directions each into four to give an extent of 150×150 mm. A load of 4000 g is applied to the thus-folded bag, and the thickness of the back in that condition is measured.

Examples 1 to 8

Comparative Examples 1 to 5

Using an extruder-type spinning machine, nylon 66 chips having a sulfuric acid-relative viscosity (measured in 98% sulfuric acid at 25° C.) of 3.7, and containing 70 ppm, in terms of copper, of copper acetate, 0.1% by weight of potassium iodide and 0.1% by weight of potassium bromide were melted, and the polymer melt was metered via a metering pump and then fed into a spinning pack. The polymer melt was filtered through the spinning pack, and then spun out via a spinneret. The temperature of the extruder and that of the spinning block (spinning beam) were so controlled that the spinning temperature (the polymer temperature at the spinning pack inlet) could be 295° C. The spinnerets were differently designed for flattened cross-section yarns and circular cross-section yarns in point of the total fineness, the number of filaments, the filament fineness and the degree of flatness of the yarns to be produced. Concretely, the number of orifices, the orifice profile and the orifice dimension of the spinnerets were specifically defined for the intended yarns.

Just below the spinneret, a 250-mm hot cylinder heated at 300° C. was disposed. The spun yarns were once passed through the 300° C. hot air atmosphere in the cylinder, and then exposed to cooling air at 20° C. applied thereto, and thereby cooled and solidified. Next, aqueous emulsion oil was applied to the yarns, which were then taken up while being wound around a take-up roller. Thus taken out, the yarns were not wound up, but were continuously fed to a heat-treatment zone, in which they were subjected to two-stage drawing followed by relaxation to be nylon 66 fibers.

Concretely, the yarns were stretched by 3% between the take-up roller and a feed roller, and subjected to first-stage drawing between the feed roller and a first draw roller and then to second-stage drawing between the first draw roller and a second draw roller. Subsequently, these were relaxed by 7% between the second draw roller and a relaxation roller, then entangled in an entangling device, and then wound up by a winder. The surface temperature of each roller was set as follows: The take-up roller was room temperature; the feed roller was 40° C.; the first draw roller and the second draw roller were 140° C. and 230° C., respectively; and the relaxation roller was 150° C. The peripheral speed of each roller was as follows: The first draw roller was constant at 3200 m/min; the second draw roller was constant at 4000 m/min; and the speed of the take-up roller and that of the feed roller were individually varied in accordance with the draw ratio that varies depending on the varying filament fineness and filament cross-section profile. For entangling them, the running yarns were exposed to high-pressure air applied thereto almost in the vertical direction to them in the entangling device. The pressure of air was varied within a range of from 0.05 to 0.4 MPa, to thereby change the number of the entanglements to be formed in the yarns.

The properties of the thus-obtained nylon 66 fibers are shown in Table 1.

Next, the nylon 66 fibers were warped at a speed of 300 m/min, and then woven into a fabric by the use of a water-jet loom (Tsudakoma's ZW303) driving at a revolution speed of 1000 rpm while the texture density was controlled. In this stage, the warp tension in warping, the warp tension in weaving, the tension between weft release and the measuring drum, and the tension in weft implantation were varied in weaving the fabric.

Next, a part of the fabric was dipped in a hot water bath at 80° C. that contained 0.5 g/liter of sodium alkylbenzenesulfonate and 0.5 g/liter of soda ash, for 3 minutes, then dried at 130° C. for 3 minutes, and then heated at 180° C. for 1 minute.

Next, a part of the fabric and a part of the heat-treated fabric were calendered. The calendering machine used is equipped with a torque motor-driving multi-stage metal roll set. Concretely, each fabric was heat-set at a metal surface temperature of 150° C. under a linear pressure of 3000 N/cm for 1 minute, and then at 180° C. and under 6000 N/cm for 1.5 minutes.

Next, using a comma coater, the fabrics were coated with a solvent-type methylvinyl-silicone resin. The resin coating amount was 15 g/m². The coated fabrics were dried at 3 minutes and then vulcanized at 180° C. for 1 minute to be base fabrics for airbags.

The conditions for producing the base fabrics, and the properties of the base fabrics are shown in Table 1.

Next, the fabrics were formed into airbags.

Concretely, two circular fabrics having a diameter of 725 mm were blanked out. The center of one of them was reinforced by laminating thereon three circular reinforcing fabrics of the same material having a diameter of 200 mm, and these were practically sewn on a machine with a nylon 66 sewing thread (470 dtex/1×3) on the circles having a diameter of 110 mm, 145 mm and 175 mm. A hole having a diameter of 90 mm was formed in the fabric, and this is for the fitting mouth for an inflator. Next, one circular reinforcing fabric of the same material having a diameter of 75 mm was applied to the fabric at the opposite positions of 225 mm in the bias direction from the center thereof, and these were practically sewn on a machine with a nylon 66 sewing thread (470 dtex/1×3) on the circles having a diameter of 50 mm and 60 mm. Two vent holes having a diameter of 40 mm were formed. Finally, the reinforced side of the circular fabric was kept outside, and this fabric was attached to the other circular fabric with the warp axes of the two being shifted by 45 degrees. In that condition, these fabrics were double-sewn on a machine with a nylon 66 sewing thread (1400 dtex/1) on the circles having a diameter of 700 mm and 710 mm. Thus fabricated, the bag was turned inside out to be a 60-liter airbag.

The thickness of the thus-fabricated airbag (containability of bag) is shown in Table 1.

TABLE 1

| | | Example 1 | Example 2 | Example 3 | Example 4 | Example 5 | Example 6 | Example 7 | Example 8 |
|---|---|---|---|---|---|---|---|---|---|
| Properties of Yarns | Total fineness (dtex) | 470 | 470 | 470 | 470 | 470 | 470 | 350 | 350 |
| | Number of filaments (filament) | 96 | 96 | 96 | 96 | 144 | 144 | 96 | 96 |
| | Filament fineness (dtex) | 4.9 | 4.9 | 4.9 | 4.9 | 3.2 | 3.2 | 3.6 | 3.6 |
| | Cross-section profile | Flat | flat | flat | flat | flat | flat | flat | flat |
| | Degree of flatness (−) | 3.6 | 3.6 | 5.5 | 5.5 | 3.5 | 3.5 | 3.6 | 3.6 |
| | Tenacity (cN/dtex) | 8.2 | 8.2 | 7.7 | 7.7 | 7.7 | 7.7 | 8.0 | 8.0 |
| | Elongation (%) | 22 | 22 | 20 | 20 | 21 | 21 | 24 | 24 |
| | Boiling water shrinkage (%) | 6.2 | 6.2 | 6.1 | 6.1 | 6.2 | 6.2 | 6.2 | 6.2 |
| | Number of entanglements (/m) | 8 | 8 | 10 | 10 | 23 | 23 | 13 | 13 |
| | Number of entanglements in fabric (/m) | 0 | 0 | 0 | 0 | 2 | 2 | 0 | 0 |
| Design and Properties of Fabrics | Texture density of warp (/2.54 cm) | 48 | 48 | 48 | 48 | 48 | 48 | 58 | 58 |
| | Texture density of weft (/2.54 cm) | 48 | 48 | 48 | 48 | 48 | 48 | 58 | 58 |
| | Cover factor (−) | 1967 | 1967 | 1967 | 1967 | 1967 | 1967 | 2059 | 2059 |
| | Warp tension max (cN/dtex) | 0.50 | 0.50 | 0.50 | 0.50 | 0.55 | 0.55 | 0.56 | 0.30 |
| | Weft tension max (cN/dtex) | 0.32 | 0.32 | 0.32 | 0.32 | 0.32 | 0.32 | 0.38 | 0.25 |
| | Scouring | No | no | no | no | no | no | yes | yes |
| | Calendaring | No | yes | no | yes | no | yes | no | no |
| | Horizontal index warp cross-section (−) | 0.96 | 0.98 | 0.96 | 0.97 | 0.88 | 0.93 | 0.89 | 0.87 |
| | weft cross-section (−) | 0.89 | 0.97 | 0.88 | 0.98 | 0.87 | 0.92 | 0.86 | 0.87 |
| | Tensile strength (N/cm) | 654 | 628 | 630 | 615 | 627 | 630 | 499 | 490 |
| | Tear strength (N) | 312 | 309 | 269 | 254 | 253 | 255 | 250 | 224 |
| | Air permeability (cc/sec/cm$^2$) | 0 | 0 | 0 | 0 | 0 | 0 | 0 | 0 |
| | Thickness of fabric (mm) | 0.27 | 0.25 | 0.26 | 0.24 | 0.26 | 0.25 | 0.20 | 0.22 |
| | Degree of stiffness (mm) | 76 | 85 | 89 | 92 | 77 | 75 | 66 | 78 |
| | Adhered resin amount (g/m) | 15 | 15 | 15 | 15 | 15 | 15 | 15 | 15 |
| | Thickness of airbag (mm) | 27 | 26 | 29 | 26 | 27 | 23 | 23 | 24 |

| | | Comp. Ex. 1 | Comp. Ex. 2 | Comp. Ex. 3 | Comp. Ex. 4 | Comp. Ex. 5 |
|---|---|---|---|---|---|---|
| Properties of Yarns | Total fineness (dtex) | 470 | 470 | 470 | 470 | (470) |
| | Number of filaments (filament) | 72 | 96 | 96 | 96 | (96) |
| | Filament fineness (dtex) | 6.5 | 4.9 | 4.9 | 4.9 | (4.9) |
| | Cross-section profile | circular | flat | flat | flat | flat |
| | Degree of flatness (−) | 1.0 | 1.3 | 3.5 | 3.5 | (9) |
| | Tenacity (cN/dtex) | 8.5 | 8.3 | 7.7 | 7.7 | Sample was impossible to prepare. |
| | Elongation (%) | 22 | 23 | 22 | 22 | |
| | Boiling water shrinkage (%) | 6.2 | 6.2 | 6.0 | 6.0 | |
| | Number of entanglements (/m) | 14 | 25 | 35 | 35 | |
| | Number of entanglements in fabric (/m) | 0 | 5 | 15 | 15 | |
| Design and Properties of Fabrics | Texture density of warp (/2.54 cm) | 48 | 48 | 48 | 48 | — |
| | Texture density of weft (/2.54 cm) | 48 | 48 | 48 | 48 | — |
| | Cover factor (−) | 1967 | 1967 | 1967 | 1967 | — |
| | Warp tension max (cN/dtex) | 0.50 | 0.50 | 0.20 | 0.20 | — |
| | Weft tension max (cN/dtex) | 0.32 | 0.32 | 0.15 | 0.15 | — |
| | Scouring | no | no | no | yes | — |
| | Calendaring | no | no | no | yes | — |
| | Horizontal index warp cross-section (−) | — | 0.84 | 0.66 | 0.78 | — |
| | weft cross-section (−) | — | 0.82 | 0.67 | 0.72 | — |
| | Tensile strength (N/cm) | 653 | 623 | 603 | 572 | — |
| | Tear strength (N) | 222 | 209 | 169 | 161 | — |
| | Air permeability (cc/sec/cm$^2$) | 0 | 0 | 0 | 0 | — |
| | Thickness of fabric (mm) | 0.31 | 0.33 | 0.34 | 0.30 | — |
| | Degree of stiffness (mm) | 119 | 114 | 109 | 99 | — |
| | Adhered resin amount (g/m$^2$) | 15 | 15 | 15 | 15 | — |
| | Thickness of airbag (mm) | 34 | 33 | 37 | 32 | — |

As is obvious from Table 1, the fibers having a specific cross-section profile and the coated base fabrics for airbags having a specific structure are good in that they are flexible and thin and are well containable.

On the other hand, the coated base fabrics for airbags of Comparative Examples 1 to 4 in which the cross-section profile of the fibers and the structure of the base fabrics are inferior to ours in point of the flexibility and the containability thereof. In addition, in Comparative Example 5 in which the degree of flatness of the cross-section of filaments was intended to be 9, nylon 66 fibers could not be produced because of frequent end down in spinning fibers.

Example 9

Comparative Example 6

The fabric produced in the same manner as in Example 1 and that produced in the same manner as in Comparative Example 1 were coated with a solvent-type methylvinyl-silicone resin, using a comma coater. The coating amount was 1 g/m$^2$, and the coated fabrics were dried for 3 minutes and then vulcanized at 180° C. for 1 minute to be coated base fabrics for airbags. These were sewed to give 60-liter airbags, in the same manner as in Example 1.

The conditions for producing the base fabrics, and the properties of the base fabrics are shown in Table 2.

Comparative Examples 7, 8

Using a comma coater, base fabrics for airbags, and airbags were fabricated in the same manner as in Example 1, except that the coated resin amount was 0.05 g/m² and 70 g/m². The properties of the base fabrics are shown in Table 2.

TABLE 2

|  |  | Example 9 | Comp. Ex. 6 | Comp. Ex. 7 | Comp. Ex. 8 |
|---|---|---|---|---|---|
| Properties of Yarns | Total fineness (dtex) | 470 | 470 | 470 | 470 |
|  | Number of filaments (filament) | 96 | 72 | 96 | 96 |
|  | Filament fineness (dtex) | 4.9 | 6.5 | 4.9 | 4.9 |
|  | Cross-section profile | Flat | circular | flat | flat |
|  | Degree of flatness (−) | 3.6 | 1.0 | 3.6 | 3.6 |
|  | Tenacity (cN/dtex) | 8.2 | 8.5 | 8.2 | 8.2 |
|  | Elongation (%) | 22 | 22 | 22 | 22 |
|  | Boiling water shrinkage (%) | 6.2 | 6.2 | 6.2 | 6.2 |
|  | Number of entanglements (/m) | 8 | 14 | 8 | 8 |
|  | Number of entanglements in fabric (/m) | 0 | 0 | 0 | 0 |
| Design and Properties of Fabrics | Texture density of warp (/2.54 cm) | 48 | 48 | 48 | 48 |
|  | Texture density of weft (/2.54 cm) | 48 | 48 | 48 | 48 |
|  | Cover factor (−) | 1967 | 1967 | 1967 | 1967 |
|  | Warp tension max (cN/dtex) | 0.50 | 0.50 | 0.50 | 0.50 |
|  | Weft tension max (cN/dtex) | 0.32 | 0.32 | 0.32 | 0.32 |
|  | Scouring | no | no | no | no |
|  | Calendering | no | no | no | no |
|  | Horizontal index   warp cross-section (−) | 0.96 | — | 0.96 | 0.96 |
|  |                   weft cross-section (−) | 0.89 | — | 0.89 | 0.89 |
|  | Tensile strength (N/cm) | 633 | 640 | 632 | 654 |
|  | Tear strength (N) | 224 | 206 | 228 | 312 |
|  | Air permeability (cc/sec/cm²) | 0 | 1 | 4 | 0 |
|  | Thickness of fabric (mm) | 0.27 | 0.31 | 0.27 | 0.27 |
|  | Degree of stiffness (mm) | 74 | 108 | 72 | 130 |
|  | Adhered resin amount (g/m²) | 1 | 1 | 0.05 | 70 |
|  | Thickness of airbag (mm) | 26 | 33 | 26 | 38 |

As is obvious from Table 2, the base fabrics formed of the flattened yarns can be uniformly coated with resin even though the coating amount of resin is reduced, and, as a result, the airbags formed of the base fabrics ensure zero air perviousness. As opposed to these, however, the base fabric formed of circular cross-section yarns in Comparative Example 6 is difficult to uniformly coat with a small amount of resin, and it could not ensure zero air perviousness. After all, the airbag formed of the base fabric is problematic in the safety thereof.

However, even the coated base fabric for airbags, which is formed of fibers having a specific cross-section profile of the invention and which has a specific structure as defined herein, could not ensure zero air perviousness when the coating resin amount is less than 0.1 g/m² as in Comparative Example 7; but on the contrary, when the coating resin amount is over 60 g/m² as in Comparative Example 8, then the bag could not realize the improved containability intended by the invention.

INDUSTRIAL APPLICABILITY

The base fabric for airbags is coated with resin and has good properties of flame resistance, complete air-imperviousness, flexibility and containability that could not be attained by any conventional non-coated or coated base fabrics for airbags. This is favorable to all types of airbags, such as airbags for drivers, airbags for passengers, side airbags, knee airbags, airbags for inflatable curtains, etc. In addition, when the specific flattened cross-section yarns are used, then the amount of fibers to be used may be reduced as compared with ordinary circular cross-section yarns, and has another effect of reducing the production costs of airbags.

The invention claimed is:

1. A coated base fabric for airbags comprising a silicone resin coating applied to a base fabric formed of flattened cross-section yarns having a degree of filament cross-section flatness (expressed as a ratio of the major axis length to the minor axis length of the filament cross-section) of from 1.5 to 8, wherein the number of entanglements in the filaments of warp yarn and weft yarn in the base fabric is at most 2/m and the filaments of the warp yarn and the weft yarn, respectively, are aligned in the base fabric such that the total average horizontal index (HI) represented by the following formula falls within a range of from 0.75 to 1.0, and the amount of the silicone resin adhered to the fabric is from 5 to 20 g/m²:

$$HI=(\Sigma hi)/f$$

wherein
 hi=cos θ,
 θ indicates the angle between the major axis direction of each filament and the horizontal direction of the fabric,
 f indicates the number of the filaments.

2. The coated base fabric for airbags as claimed in claim 1, wherein the total average horizontal index (HI) is from 0.85 to 1.0.

3. The coated base fabric for airbags as claimed in claim 1, which satisfies the following conditions (1) to (5):
 (1) Cover factor: 1500 to 2400,
 (2) Tensile strength: 500 to 750 N/cm,
 (3) Tear strength: 200 to 400 N,
 (4) Thickness: 0.20 to 0.35 mm,
 (5) Permeability: 0 that is measured at a pressure of 19.6 KPa.

4. The coated base fabric for airbags as claimed in claim 1, wherein the flattened cross-section yarn is formed of a polyamide having a sulfuric acid-relative viscosity of at least 3.0.

5. A coated base fabric for airbags consisting of a silicon resin elastomer coating applied to a base fabric formed of flattened cross-section yarns having a degree of filament cross-section flatness (expressed as a ratio of the major axis length to the minor axis length of the filament cross-section) of from 1.5 to 8, wherein the number of entanglements in the filaments of warp yarn and weft yarn in the base fabric is at most 2/m and the filaments are aligned in the base fabric such that the total average horizontal index (HI) represented by the following formula falls within a range of from 0.75 to 1.0, and the amount of the silicone resin adhered to the fabric is from 5 to 20 g/m²:

$$HI = (\Sigma hi)/f$$

wherein
 $hi = \cos\theta$,
 $\theta$ indicates the angle between the major axis direction of each filament and the horizontal direction of the fabric,
 f indicates the number of the filaments.

* * * * *